Figure 1:
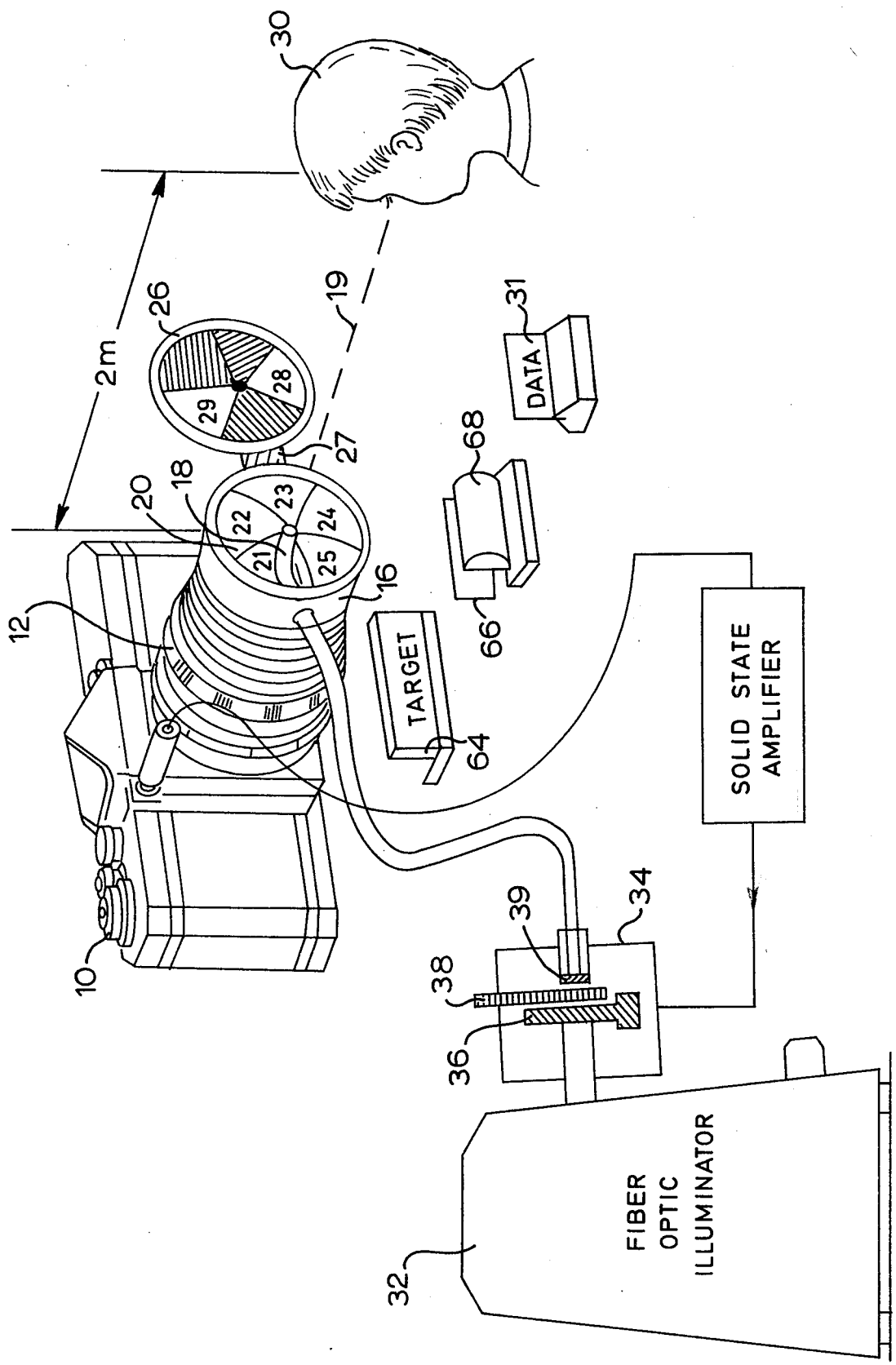

United States Patent [19]
Howland et al.

[11] 3,879,113
[45] Apr. 22, 1975

[54] PHOTO-REFRACTOMETER AND METHODS FOR OPHTHALMIC TESTING OF YOUNG CHILDREN

[76] Inventors: Howard C. Howland, 205 Winston Dr., Ithaca, N.Y. 14850; Bradford Howland, 77 Massachusetts Ave., Cambridge, Mass. 02139

[22] Filed: May 7, 1973

[21] Appl. No.: 358,246

[52] U.S. Cl. .................. 351/7; 351/39; 351/158
[51] Int. Cl. ............................................ A61b 3/14
[58] Field of Search ...................... 351/7, 39, 158

[56] References Cited
UNITED STATES PATENTS

| | | | |
|---|---|---|---|
| 3,519,338 | 7/1970 | Papuetz | 351/7 |
| 3,602,580 | 8/1971 | Samuels | 351/7 X |

*Primary Examiner*—Paul A. Sacher
*Attorney, Agent, or Firm*—Jack Larsen

[57] ABSTRACT

Because the retina of the normal eye is an imperfect absorber of light, a portion of the light that reaches the retina is reflected back through the lens. If one's eye is focussed at a point source of light, the retroreflected light is concentrated by the eye in a small circle surrounding the source; the more accurately focussed the eye, the smaller the spot. Eye testing apparatus and methods are described in which the source is the tip of a fiber optic probe, and the retroreflected light is captured by a camera lens surrounding the probe. The eye defects are quantified by a plurality of cylindrical sector lenses arranged pie-slice fashion around the probe, each of which forms the arm of a star pattern on the film which is a measure of the amount and kind of refractive error. The apparatus is extended by the use of fixed reflectors on eyeglass frames so that phoria may be measured from pupil spacing and position relative to the fixed images of the reflectors. The methods take advantage of inherent chromatic abberation of the eye.

10 Claims, 6 Drawing Figures

PHOTO-REFRACTOMETER AND METHODS FOR OPHTHALMIC TESTING OF YOUNG CHILDREN

This invention relates to optometry and ophthalmology; and more particularly to apparatus and methods for testing the eyes of persons such as very young children who may be unable or unwilling to communicate with an optometrist or ophthalmologist.

Recently Freeman, Mitchell, and Millodot (Science, vol 175, p 1384) have reported that astigmatism in the very young inhibits the development of the optical processing mechanisms in the brain. In consequence of this fact, providing corrective lenses in later life in order that a normal image is focussed on the retina, may not be sufficient to provide normal vision. It has been recognized for some years that squint must be dealt with very early in life. Now it is clear that astigmatism must also be dealt with promptly, and the earlier the better.

An object of the invention is to provide more objective and reliable eye tests for automobile operator licensing and other situations where an objective record of refractive status of the eyes is desired.

The invention is based on the fact that a necessary but not sufficient condition for visual acuity is that a sharp image of an object viewed must be formed on the retina of the eye. Light from a line on the object must converge to a line on the retina, and a point on the object should be imaged as a point on the retina.

It is a feature of the invention to provide a point light source near a target which the subject fixates. When this source is flashed, a bright spot of light is sharply imaged on the retina if the eye is properly focussed. The retina is an imperfect absorber, so a substantial portion of the light from the flash is reflected back through the lens of the eye and is focused by the eye at some point along the axis defined by the source and the eye. In the idealized case, it would focus at the source; but actually the reflected image forms an illuminated spot around the small area of the source.

A second feature of the invention is that the source is formed by a fiber-optic light guide led to the center of the wide aperture (f/1.2) 55 mm focal length lens of a 35 mm camera. This lens collects the returned light around the probe. In the preferred mode of operation the light from each pupil, instead of being brought to a focus on the film as a small circle representing the diameter of the pupil, is spread out into a star pattern by a number of weak plano-cylindrical lens sectors arranged around the probe. The cylinder axes of the pie shaped sectors are perpendicular to the camera axis and to their radial bisectors.

The effect of each cylinder lens sector is to display along its leg of the total star shaped image the rays of light reaching the camera lens through that sector and from the pupil of the eye at successively greater radial distances from the probe. If the eye is perfectly focussed on the plane of the probe, the retroreflected light will impinge close to the probe and the resulting star pattern will be small in extent, but for a defocussed eye, the legs of the star pattern will be longer in proportion to the amount of defocus. Astigmatism is shown by legs of uneven length; however, the astigmatic eye tends to focus at a distance which is intermediate between its two principal foci, thereby minimizing the uneven length of the legs of the pattern. The optical system of the eye is, however, known to have strong chromatic aberation so that flashing of the fiber optic probe with a different color from that with which the eye has fixated will produce a different star pattern, clearly exhibiting the astigmatism.

It is, therefore, a third feature of the invention to provide light flashes of two or more colors wherewith to resolve ambiguity in test results with only one color.

The position of the head may be established by reflections from reference reflectors fixed to the head. Conveniently these may be carried on dummy eyeglass frames. It is a further object of the invention to provide such reference reflectors.

Figure 2:
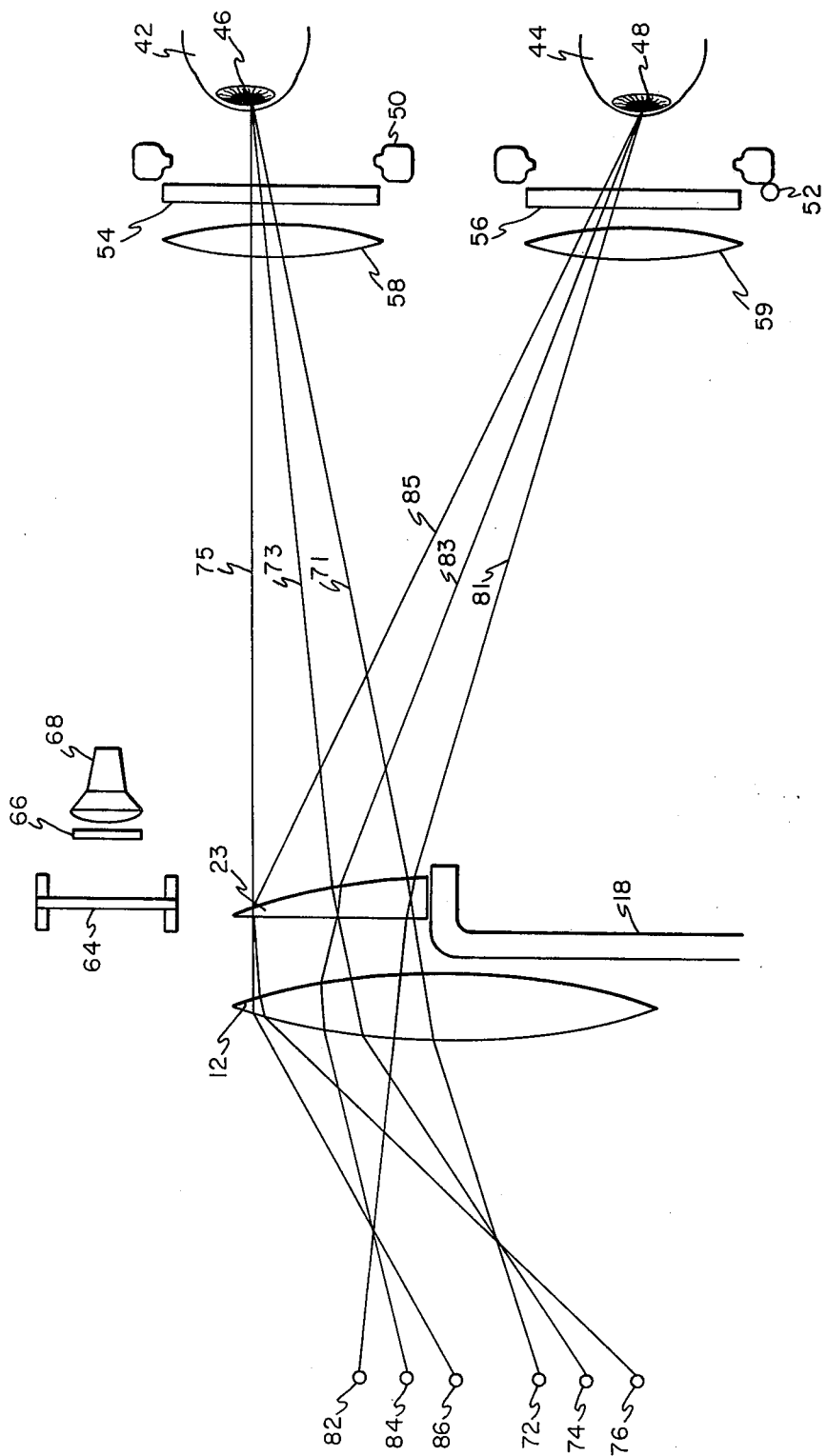
Figure 3:
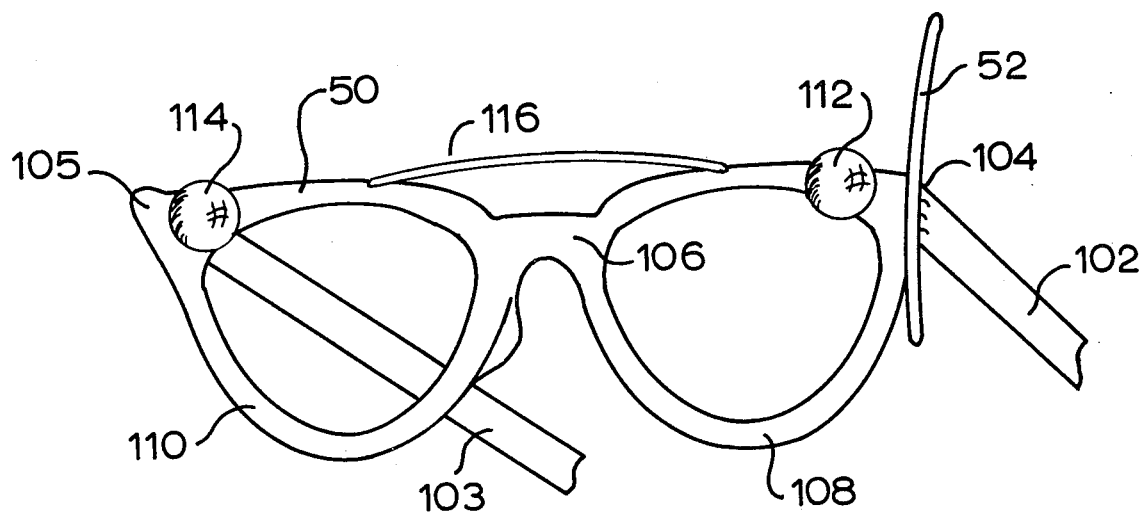
Figure 4:
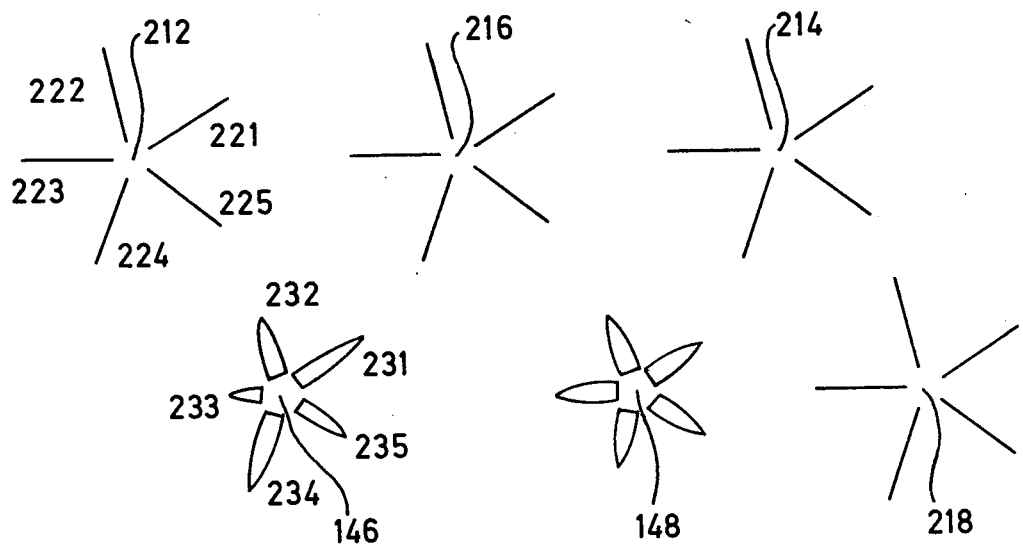
Figure 5:
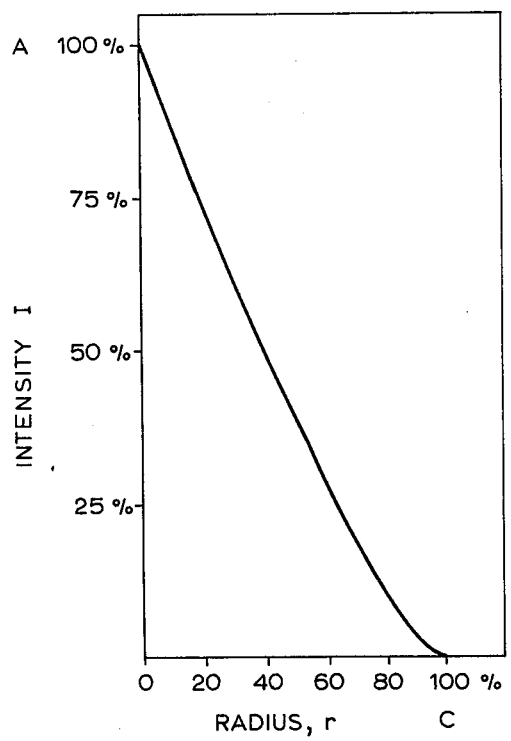
Figure 6:
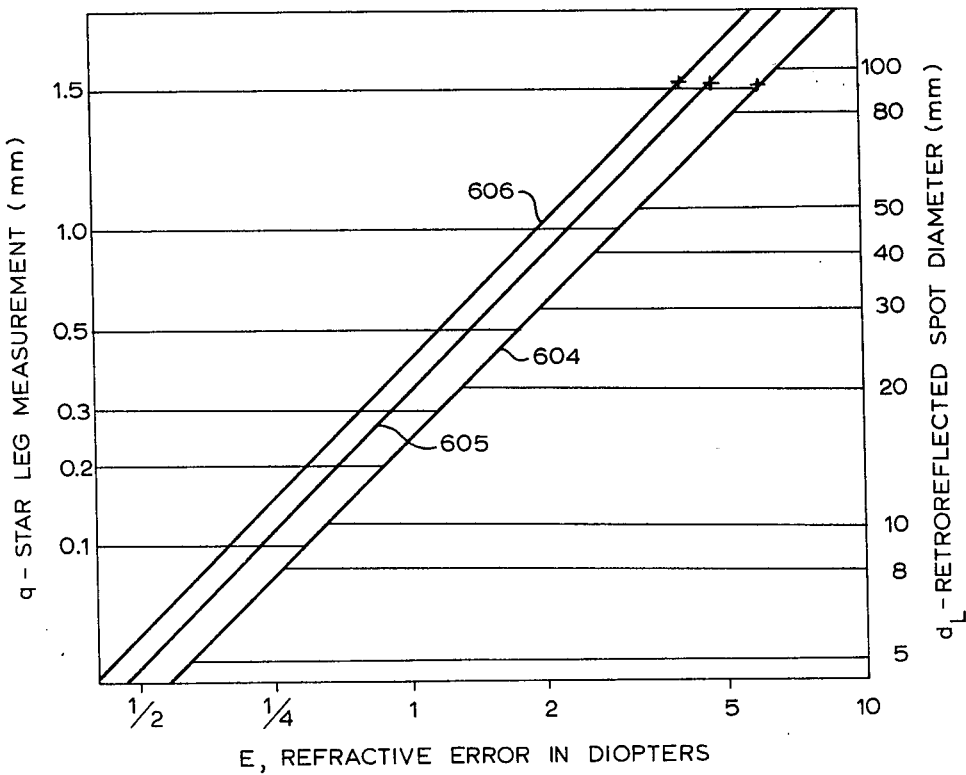

Other objects and features of the invention will in part be obvious, and in part will be apprehended from the following specification taken in conjunction with the annexed drawings of which:

FIG. 1 is a schematized drawing of a preferred embodiment of the invention,

FIG. 2 is a drawing in the nature of a horizontal section through the apparatus of FIG. 1 to illustrate its mode of operation, FIG. 3 is a perspective view of dummy frames used with the invention, FIG. 4 is a representation of the star patterns from which measurements are made, FIG. 5 is a graph representing the distribution of light retroreflected through an eye lens about a point source, and FIG. 6 is a graph indicating the size of the retroreflected spot, and of star images for different pupil sizes and refractive errors.

FIG. 1 represents the form of the apparatus for use as an attachment to a 35 mm. camera. The camera is equipped with a large aperture lens 12 (such as 55 mm f/1.2). In front of the lens 12 is mounted an analyzer lens assembly 16. A fiber optic light guide 18 is led into this assembly and emerges from the center of the analyzer lens directed along the optical axis 19 of the camera. The analyzer lens 20 comprises five cylinder lens sectors 21–25 of about 1 diopter power with their cylinder axes perpendicular to their radial bisectors, the latter being spaced at 72° intervals. Thus the axis of the horizontally oriented sector 23 is vertical.

A second lens assembly 26 is attached by hinge 27 to the analyzer lens assembly 16. This second assembly has two lens sectors 28 and 29 which overlay sectors 24 and 22, respectively. Sector 28 is a negative cylinder lens to cancel out the effect of the sector 24. Through this sector, therefore, an essentially undistorted photograph may be made of the subject 30 for purposes of identification. The sector 29 is a wedge with a cylinder correction and positive power so as to photograph with and superimpose on the identification photograph, the additional identification data carried on the data card 31.

The light guide 18 is connected at its other end to a fibre-optic illuminator 32, modified by an adapter 34 in which are contained an electro-mechanical shutter 36, a color filter 38, and an infra-red-absorbing filter 39. The subject is situated so that he may fixate on a target 64 which may be illuminated by light of a color determined by a filter 66 from a source 68.

Referring now to FIG. 2, the subject 30 is here represented by corneal surfaces 42, 44, and pupil openings 46, 48. The subject may wear dummy frames 50 which carry a reflector 52. Means may be provided to position color filters 54, 56, and test lenses 58, 59.

In operation, the camera is first adjusted without the analyzer lens 20, so that the image of the subject's pupils is brought to a focus on the film plane. Light from the probe 18 enters the eye and is reflected back through the pupil 46 to impinge upon the sector 23 and the others not shown. Some of these rays, indicated by the line 71 reach the camera lens 12 near its center, are relatively undeflected by the sector 23, and reach the film plane at point 72 near the center of the star pattern. Other rays represented by the line 73 reach the lens 12 and the sector 23 at an intermediate radial distance, and converge on the film at a point 74, having been deflected by the sector 23 away from the point 72. Similarly, rays represented by the line 75 reach the outer edge of the sector 23, and are furthest deflected to the point 76 marking the extreme distal point of the star image.

In like manner from the other eye rays 81, 83, and 85 reach the sector 23 at minimum, intermediate, and maximum points of cylinderical correction, and are deflected to points 82, 84 and 86 in the film plane, 90.

In addition to these star patterns with a leg for each sector lens, and a pattern for each eye, additional points of reference may be recorded on the film. The dummy frames shown in FIG. 3 provide such points. The frame 50 has a pair of bows, 102, 103, with hinges 104, 105 at each side and the nose piece 106 between the rims 108 and 110. The frame is modified by two spherical reflectors 112, 114, which may be ⅜ inch diameter steel balls cemented to the frame near the hinges and by a first toroidal reflector segment 52 cemented to the frame 108 with its plane generally vertical and normal to the axis defined by the centers of the two spherical reflectors 112, 114. A second toroidal reflector 116 is mounted centrally between the tops of the rims 108, 110, with its plane generally horizontal as worn. The toroidal reflectors 52, 116 may be of polished piano wire of convenient diameter, such as 0.10 inch and with the radius left as spooled, (approximately 10 cm.) Reflections from these reflectors provide a convenient measure of the angular position of the head.

FIG. 4 represents a star pattern such as might result from a photograph taken with the apparatus of FIGS. 1–3.

The subject would be directed to fixate at the target 64 in the plane of the camera, the target, camera, and source being at a distance of about two meters. The target may be illuminated with blue or white light. Neither filters 54, 56 nor lenses 58, 59 are required. The test is made by flashing the probe with white light in synchronism with the camera shutter. Star patterns 146 and 148 are the result of retroreflection through the pupils of the eyes 46 and 48 respectively. Stars 212 and 214 indicate reflectors 112 and 114 respectively while stars 216 and 218 mark the reflections from the reflectors 116 and 52 respectively.

As mentioned above, the arms of the stars are generated by the corresponding sectors 21–25. Thus, the arm 221 of star 212 is generated by sector 21, arm 222 by sector 22, arm 223 by sector 23, arm 224 by sector 24, and arm 225 by sector 25. Similarly arms 231 through 235 of star 146 result from sectors 21 through 25 respectively. The arms of the star 212 ara all equal in intensity and length, while the arms of the star 146 appear unequal in intensity and length. This results from the fact that the sectors 21–25 are uniformly illuminated from the reflector 112, while the sectors are unequally illuminated by the retroreflection from an astigmatic eye.

FIG. 5 represents the fall-off of retroreflected light intensity in the lens plane as a function of the distance from the point source at the center of the lens. It will be noted that there is a substantially linear fall-off from a maximum intensity A at the center to a rather sharply defined edge of zero intensity at a radius C from the center of the lens. The curve of intensity is seen to be essentially straight out to the distance C/2, being substantially defined by the equation:

$$I = (4 - (5r/c)) \cdot A/4 \quad 0 \leq r \leq C/2 \tag{1}$$

where I is the intensity at radius $r$ and A and C have their above meanings.

The density, D, of image at the film plane is proportional to the product of this function and a weighting function for the widening of the sector with increased radius in this range, since the sector lens concentrates the light from an increased area at increased radial distance, thus for small angle pie-shaped segments:

$$D \cong K \cdot I \cdot r \quad \text{for } 0 < r < R \cos(\theta/2) \text{ and} \tag{2}$$
$$0 < r < C/2$$

where $\theta$ is the apex angle of the sector lens (for 5 sectors $\theta = 72°$, $\cos(\theta/2) \cong 0.89$), K is a constant of proportionality, and R is the radius of the lens aperture. Combining:

$$D \cong (4r - (5r^2/C)) \cdot K \cdot A/4 \tag{3}$$

This quantity reaches its maximum when the derivative with respect to r is zero, for which it is necessary that $$10 \, r = 4 \, C \tag{4}$$

and $$r = 0.4 \, C \tag{5}$$

The diameter of the circle which circumscribes one of the star images of a pupil is proportional to the diameter of the spot of light at the lens when the spot falls wholly within the lens aperture. It is not practical to measure the tips of a star, rather it is preferable to detect the point of maximum image density in each leg of a star. The circle which includes these points has a diameter of approx. 40 percent of the total star diameter (by equation (5)). For larger stars where all of the retroreflected light does not fall on the lens, the tips are thereby cut off so that the maximum falls beyond 40%. The diameter of the retroreflected spot at the camera lens aperture plane, $d_L$, is proportional to the pupil diameter of the subject, $p$, his refractive error, E, (i.e. the dioptric disparity between the plane of focus of the subject and the camera), and the distance from the subject to the camera in meters, $a$. Thus:

$$d_L = 2 \, p \cdot E \cdot a \tag{6}$$

The distance, $q$, measured in millimeters from the center of a star image radially to the point of maximum density on each leg of a symmetrical star image is related to the focal length of the camera lens, F, and the effective dioptric power of the supplementary cylindrical lens segments, g, as:

$$q = 0.2 \, F \cdot g \cdot d_L \quad (7)$$

when F is in meters. Combining equations (6) and (7) and rewriting we may express the refractive error of the subject as a function of the measurement, q, and the parameters of the optical system as:

$$E = 2.5 \, q/(F \cdot g \cdot p \cdot a) \quad (8)$$

These relationships are shown in FIG. 6.

Curves 604, 605, and 606 represent the size of the retroreflected spot at the camera lens aperture plane, $d_L$, for pupils of 4, 5, and 6 mm diameter respectively for a camera-subject distance of 2 meters as indicated by the right hand scale. The left-hand scale indicates the corresponding value of $q$ measured in millimeters from the center of a star image radially to the point of maximum density on each leg of the star image for a 55 millimeter (18 diopter) camera objective and a sector lens of effective cylindrical power of 1 diopter.

The useful limit of the measuring technique is reached where the maxima of the star patterns in the camera aperture plane lie at a distance of $\cos \theta$ times the radius of the camera lens. Thus in this case $$0.4 \, d_L = (F/(2f)) \cos(\Theta/2) \quad (9)$$

or by equation (6):

$$E_{max} = 1.25 \, F \cos(\Theta/2)/(p \cdot a \cdot f) \quad (10)$$

where $E_{max}$ is the maximum refractive error measurable by the system, and f is the f stop of the lens. These limits are indicated by crosses for each of the curves of FIG. 6.

The foregoing has generally related to detecting refractive errors such as near-sightedness. The measurement of astigmatism and the detection of the sign of the defect calls for a combination of a number of such test photographs.

An astigmatic subject attempting to focus on a target will ordinarily adjust his eyes for the best compromise image in which case his line foci bracket the target. If he is focussing in red light (filter 66 red) the resulting star pattern for a red flash (filter 36 red) has substantially equal arms. The size of the star indicates the presence of a refractive error, but it is unknown whether the subject is astigmatic, myopic, or hyperopic.

A second photograph made with a blue probe flash (but red target) serves to indicate the sign of the error and the amount and the axes of the astigmatism. This is in consequence of the substantial amount of chromatic abberation which is an inherent characteristic of the eye. Its amount remains substantially constant from person to person.

The refraction of blue light is greater than that of red; therefore if the eye is myopic the indicated refractive error is increased with a blue probe light, while if hyperopic the error is reduced. In like manner the blue probe pattern for an astigmatic eye exhibits marked difference in the measurements of the arms to indicate the direction and power of the astigmatic defect.

The following is a typical test routine for use of the apparatus. Except for Test Photograph 1 the room is darkened.

TEST PHOTOGRAPH I. IDENTIFICATION

With the lens assembly 26 swung into position over the camera objective 12 and the analyzer assembly 16, a data card with name and other pertinent information is inserted into the data-card holder 31, and a photograph is taken of the subject using either available light, or auxiliary lamps (not shown). The result is a normal photograph of the subject, with his data superimposed, thereby assuring positive correlation between the subject and the test data.

TEST PHOTOGRAPH II, REFRACTION

The assembly 26 is swung aside and the subject instructed to look at the target. With the subject fixating on the target under red illumination the probe is flashed with red light resulting in the star pattern as above described.

TEST PHOTOGRAPH III, ASTIGMATISM

With the same arrangement as for the above test, fixating with red light, the probe is flashed with blue light. As indicated above this test provides the measure of the amount and direction of astigmatic and/or myopic defect present.

TEST PHOTOGRAPH IV, HYPEROPIA

In farsightedness the image of an object at infinity is focussed by the relaxed eye behind the retina. A young child with this condition ordinarily can accomodate to focus upon near objects, although this requires more effort than for a normal person. Such a child would have little or or no refractive error as measured by the above tests. The test to detect this condition is conducted with the subject wearing +2 diopter "reading" glasses. If the eye is normal a repeat of the photograph as in Test Photograph II in this case results in the normal eye being unable to focus on the target, and hence showing a large refractive error while the eye with 2 or more diopters of hyperopia performs at least as well as it did in Photograph II.

TEST PHOTOGRAPH V, PHORIA LEFT EYE

The subject is fitted with the special locater frame (FIG. 3) a red filter lens 56 being clipped over the left eye. The fixation target is illuminated with blue or green light and placed at 1 meter distance from the subject. The photograph is taken with a red flash from the probe. Measurements made on the resulting images will show whether the left eye, deprived of guiding stimuli will continue to "track" with the right eye or if it will wander off.

TEST PHOTOGRAPH VI, PHORIA RIGHT EYE

The red filter lens is moved to the right eye and the procedure for photograph V is repeated for the right eye.

TEST PHOTOGRAPH VII CALIBRATION

The final photograph is made as in the foregoing two photographs but without the red eye filter. This indicates the normal spacings between the pupil reflections and the indexing reflectors.

DATA REDUCTION

It may be noted that the evaluation of the films may require no more than a projector and a scale to measure the magnified image. As can be seen from equation (8) above the magnitude of the refractive error along any axis is a simple function of the distance, q, of the center of the star pattern to the point of maximum density of a leg along that axis and the diameter of the pupil, p. The pupil width p can also be measured directly from the photographs, it is related to the widths of the legs of the star pattern, w, by the equation:

$$P = W \cdot F/a \quad (11)$$

where F and a have their above meanings. The approximation is very close, the error being less than 3% for the lenses and subject distances discussed above.

It will be understood that the foregoing is a description of the invention and the best mode contemplated by the inventors for practicing the invention. It will be clear, however, that variations and modifications in the apparatus may be made without departing from the invention, and that alterations in the methods to omit and rearrange steps may also be made in the same sense, the scope of the invention being as designated in the claims, in particular the novel methods are not limited to the novel camera means as the means to direct the flash and to capture and analyze the retroreflected light.

The measurement benefits from making the source spot as small as possible, however, there are indications that the retina may be damaged if the intensity is too great, accordingly we have used a light guide having an optical diameter of 1/8 inch which has been found to be satisfactory for illumination with a tungsten lamp. For useful results the probe diameter should be less than four millimeters and the camera aperture at least 20 millimeters.

TABLE I

SYMBOLS

| | |
|---|---|
| A | maximum intensity of spot |
| $a$ | distance from subject to camera in meners |
| C | radius of spot (outer boundry) |
| $d_L$ | diameter of spot at camera lens plane. |
| D | density of the image at the film plane |
| E | refractive error (dioptric disparity between plane of focus of the subject and the camera) |
| $f$ | $f$ stop of lens |
| F | Focal length of lens |
| $g$ | effective dioptric power of supplementary cylindrical segements. |
| I | intensity at a radius $r$ |
| K | constant of proportionality |
| $p$ | pupil width |
| $q$ | distance from center of star pattern to point of maximum density |
| $r$ | a radius |
| $w$ | with of leg of star at film plane |
| $\theta$ | angle of apex of cylinder lens segment |

We claim:

1. A method of testing the eyes of a subject comprising the steps of a. directing a flash from substantially a point source toward the eyes of said subject,
   b. capturing the retroflected light from the retina of an eye by a photographic camera having a lens and a plurality of cylinder lenses overlaying said camera lens surrounding said source, and
   c. measuring the size and ellipticity of the beam of retroflected light from said eyes for at least two colors whereby said size and ellipticity is a function of the refractive and astigmatic states of said eyes.

2. The method of claim 1
   d. wherein said flash is of red light transmitted through a fiber-glass guide to the center of said camera lens,
   e. together with the step of directing through said guide a second flash of blue light,
   f. wherein said retroflected light from said two flashes are captured in successive frames of photographic film.

3. The method of claim 2
   g. wherein said measuring step comprises converting said retroflected light to star images for measurement.

4. For the detection of hyperopia the method of Claim 3 in further combination with the steps of
   (h) furnishing the subject with strong reading glasses,
   (i) directing a third flash toward said eyes, and
   (j) measuring the extent and density resulting star images of the pupils of said eyes.

5. A method for the detection of phoria in a subject,
   a. fixing to the head of the subject a pair of retroflectors one near each eye,
   b. covering one eye with a color filter to transmit a first color and to absorb a second color,
   c. presenting a target illuminated by said second color,
   d. while said subject is observing said target illuminated with said second color, directing a flash from substantially a point source toward the eyes of said subject,
   e. capturing the retroflected light from the retina of said eyes by analyzing means surrounding said source,
   f. recording said retroflected light, and
   g. measuring the size and position of the beams reflected from said eyes relative to the reflections from said retroflectors whereby the size and position of the reflected beams relative to the reflections from said retroflections are a function of the phoria of said subject.

6. Apparatus for eye testing comprising,
   a. a camera for taking photographs having a large objective lens aperture,
   b. a point source of light positioned effectively at the center of said objective and directed along the camera axis toward a subject to be tested, and
   c. an analyzer lens assembly comprising a plurality of cylinder lens sectors situated pie-slice fashion around said source to intercept said light retroflected from the retina of the eyes of said subject whereby the characteristics of the reflected light on said analyzer lens assembly means is a function of the refractive and astigmatic states of the eyes of said subject.

7. Apparatus as defined by claim 6,
   d. wherein said aperture is greater than 20 mm. in diameter, e. said source is the tip of a fibre-optic light guide not more than 5 mm in diameter, and said sectors have at least three non-parallel axes.

8. Apparatus as defined by claim 6, in further combination with d. filter means for limiting the spectral content of said source to a small fraction of the visible spectrum.

9. Apparatus as defined by claim 8 in further combination with e. means to present with light from another fraction of the visible spectrum an image to be viewed by said subject.

10. Apparatus as defined by claim 6 in further combination with d. frames having a spherical reflector at each side, a first toroidal segment reflector bridged across the brow with axis nominally vertical as worn, and a second toroidal segment reflector at one side with axis nominally horizontal as worn.

* * * * *